United States Patent
Fatemi et al.

(10) Patent No.: US 12,244,206 B2
(45) Date of Patent: Mar. 4, 2025

(54) APPARATUS FOR ISOLATION AND MEASUREMENT OF A ROTARY ELECTRIC MACHINE

(71) Applicant: GM Global Technology Operations LLC, Detroit, MI (US)

(72) Inventors: Alireza Fatemi, Canton, MI (US); Velmurugan Ayyanar, Pondicherry (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 316 days.

(21) Appl. No.: 17/898,672

(22) Filed: Aug. 30, 2022

(65) Prior Publication Data

US 2024/0072601 A1 Feb. 29, 2024

(51) Int. Cl.
*H02K 5/15* (2006.01)
*H02K 5/173* (2006.01)
*H02K 7/08* (2006.01)

(52) U.S. Cl.
CPC ............. *H02K 5/1732* (2013.01); *H02K 5/15* (2013.01); *H02K 7/083* (2013.01)

(58) Field of Classification Search
CPC ........ H02K 5/1732; H02K 5/15; H02K 7/083; H02K 11/40; H02K 5/08; H02K 5/1672; H02K 11/21; H02K 11/27
See application file for complete search history.

(56) References Cited

U.S. PATENT DOCUMENTS

2014/0199870 A1* 7/2014 Tamaki ................ H01R 13/658 439/271
2023/0238852 A1* 7/2023 Kawamura ............ H02K 24/00 310/54

* cited by examiner

*Primary Examiner* — Thomas Truong
(74) *Attorney, Agent, or Firm* — CANTOR COLBURN LLP

(57) ABSTRACT

An enclosure for a rotary electric machine may include a housing supporting a stator of the electric machine and first and second end plates attached to the housing and rotatably supporting a rotor at opposite ends with respective first and second bearings isolated from the end plates.

20 Claims, 8 Drawing Sheets

APPARATUS FOR ISOLATION AND MEASUREMENT OF A ROTARY ELECTRIC MACHINE

INTRODUCTION

The subject disclosure relates to rotary electric machines.

Multi-phase AC machines may employ power inverters including high-frequency, solid state switching to synthesize multi-phase AC voltages for providing electrical power to the machine's stator windings. Synthesized multi-phase AC voltages are sinusoidal approximations of fundamental frequencies and may result in common-mode voltage excitations of the stator windings at non-fundamental frequencies. These excitations may cause induced voltages and parasitic currents within the machine structures through an intrinsic impedance network including the stator windings, the stator and rotor cores, the rotor shaft, the bearings and the frame. These parasitic currents may arc across bearing components and lubricants, may arc across gearbox components in connected drivetrains, and may be responsible for some resistive losses in the machine. It may be desirable to understand what types and qualities of induced voltages and currents are present in a multi-phase AC machine. Understanding the impact of operational and configurational changes to a multi-phase AC machine and connected systems may be valuable in machine and system design work. Characterization of such induced voltages and currents in multi-phase AC machine may be useful in reducing the parasitic currents and mitigating their effects.

SUMMARY

In one exemplary embodiment, an apparatus for electrically isolating a rotary electric machine may include an enclosure for the rotary electric machine having a housing supporting a stator of the electric machine, the housing having first and second ends and first and second end plates attached to the housing and rotatably supporting a rotor at opposite ends with respective first and second bearings, the bearings being isolated from the end plates.

In addition to one or more of the features described herein, the apparatus may further include a fixture to which the enclosure is mechanically grounded.

In addition to one or more of the features described herein, the fixture may be isolated from the enclosure.

In addition to one or more of the features described herein, the enclosure may be mechanically grounded to the fixture through a fixture bracket that is isolated from the enclosure by an isolator pad trapped between the fixture bracket and the enclosure.

In addition to one or more of the features described herein, the apparatus may further include first and second slip rings maintaining dynamic galvanic contact with the rotor at respective opposite ends, each of the first and second slip rings supported by one of the first and second end plates, the slip rings being isolated from the end plates.

In addition to one or more of the features described herein, the apparatus may further include a rotational sensor having a rotating portion engaged with the rotor and a static portion affixed to one of the first and second end plates.

In addition to one or more of the features described herein, the static portion of the rotational sensor may be isolated from the one of the first and second end plates with an isolator pad trapped between and separating the static portion of the rotational sensor and the one of the first and second end plates.

In addition to one or more of the features described herein, the first and second bearings may be affixed to respective bearing hubs, and each of the first and second bearing hubs may be isolated from a respective one of the first and second end plates with a respective isolator pad trapped between and separating the respective bearing hub and the respective one of the first and second end plates.

In addition to one or more of the features described herein, the apparatus may further include O-ring seals between each respective isolator pad and the respective bearing hub and between the respective isolator pad and the respective one of the first and second end plates.

In addition to one or more of the features described herein, the apparatus may further include a probe galvanically coupling to one of the first and second bearing hubs and interiorly accessible.

In addition to one or more of the features described herein, the apparatus may further include a probe passing through one of the first and second end plates and into to the respective bearing hub, the probe being isolated from the end plates.

In addition to one or more of the features described herein, the apparatus may further include a probe passing through one of the first and second end plates and galvanically coupling to the respective bearing hub, the probe being isolated from the end plates and exteriorly accessible.

In addition to one or more of the features described herein, the apparatus may further include a jumper lead galvanically coupled to the probe.

In addition to one or more of the features described herein, the apparatus may further include fluid fittings on the enclosure coupled to non-conductive tubing.

In another exemplary embodiment, an apparatus for electrically isolating a rotary electric machine may include an enclosure for the rotary electric machine including a housing supporting a stator of the electric machine, the housing having first and second ends, first and second end plates attached to the housing and rotatably supporting a rotor at opposite ends with respective first and second bearings, the bearings being isolated from the end plates, wherein the first and second bearings are affixed to respective bearing hubs, and wherein each of the first and second bearing hubs is isolated from a respective one of the first and second end plates with a respective isolator pad trapped between and separating the respective bearing hub and the respective one of the first and second end plates, and a fixture to which the enclosure is mechanically affixed through respective fixture brackets affixed to the first and second end plates, the first and second end plates isolated from the respective brackets by respective isolator pads trapped between and separating the first and second end plates and the respective brackets.

In addition to one or more of the features described herein, the apparatus may further include first and second slip rings maintaining dynamic galvanic contact with the rotor at respective opposite ends, each of the first and second slip rings supported by one of the first and second end plates, the slip rings being isolated from the end plates.

In addition to one or more of the features described herein, the apparatus may further include a rotational sensor having a rotating portion engaged with the rotor and a static portion affixed to one of the first and second end plates, wherein the static portion of the rotational sensor is isolated from the one of the first and second end plates with an isolator pad trapped between and separating the static portion of the rotational sensor and the one of the first and second end plates.

In addition to one or more of the features described herein, the apparatus may further include a probe passing through one of the first and second end plates and galvanically coupling to the respective bearing hub, the probe being isolated from the end plates and exteriorly accessible.

In addition to one or more of the features described herein, the apparatus may further include first and second slip rings maintaining dynamic galvanic contact with the rotor at respective opposite ends, each of the first and second slip rings supported by one of the first and second end plates, the slip rings being isolated from the end plates, and a rotational sensor having a rotating portion engaged with the rotor and a static portion affixed to one of the first and second end plates, wherein the static portion of the rotational sensor is isolated from the one of the first and second end plates with an isolator pad trapped between and separating the static portion of the rotational sensor and the one of the first and second end plates.

In yet another exemplary embodiment, an apparatus for electrically isolating a rotary electric machine may include an enclosure for the rotary electric machine having a housing supporting a stator of the electric machine, the housing having first and second ends, first and second end plates attached to the housing and rotatably supporting a rotor at opposite ends with respective first and second bearings, the bearings being isolated from the end plates, wherein the first and second bearings are affixed to respective bearing hubs, and wherein each of the first and second bearing hubs is isolated from a respective one of the first and second end plates with a respective isolator pad trapped between and separating the respective bearing hub and the respective one of the first and second end plates, first and second slip rings maintaining dynamic galvanic contact with the rotor at respective opposite ends, each of the first and second slip rings supported by one of the first and second end plates, the slip rings being isolated from the end plates, a probe passing through one of the first and second end plates and galvanically coupling to the respective bearing hub, the probe being isolated from the end plates and exteriorly accessible, and a fixture to which the enclosure is mechanically affixed through respective fixture brackets affixed to the first and second end plates, the first and second end plates isolated from the respective brackets by respective isolator pads trapped between and separating the first and second end plates and the respective brackets.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1A:
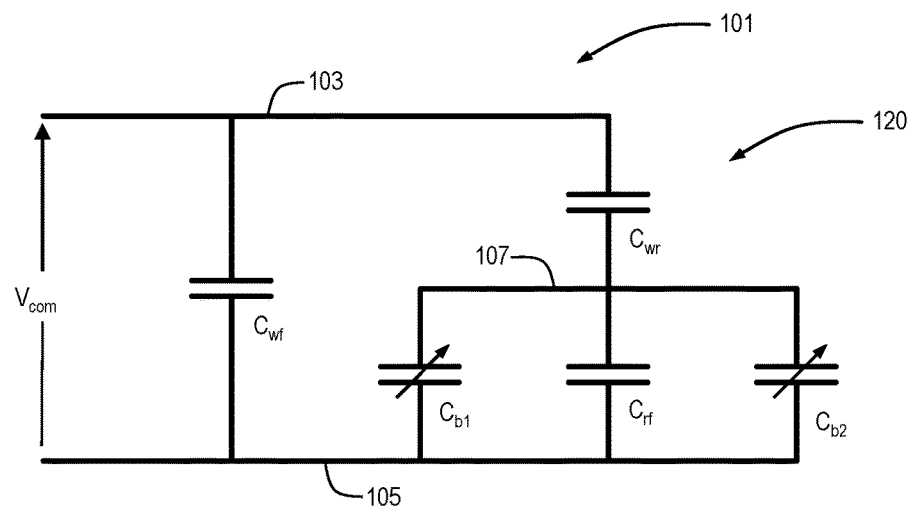
FIGS. 1A-1C illustrate models of a rotary electric machine, in accordance with one or more embodiments.

The following description is merely exemplary in nature and is not intended to limit the present disclosure, its application or uses. Throughout the drawings, corresponding reference numerals indicate like or corresponding parts and features.

The disclosed improvements relate to an apparatus for electrically isolating a rotary electric machine and for acquiring data related thereto. An electric machine for use in such apparatus may be a multi-phase AC motor ("motor"). Such motors are used variously as prime movers in transportation applications and in industrial applications. Such motors may, for example, be an interior permanent magnet (IPM) machine, a permanent magnet synchronous reluctance (PMSR) machine, a synchronous reluctance (SR) machine, an induction machine, or any AC machine including a rotor and a multi-phase AC stator coupled to a power inverter. References to motor herein are understood to refer to any rotary electric machine including motors and generators.

Figure 1B:
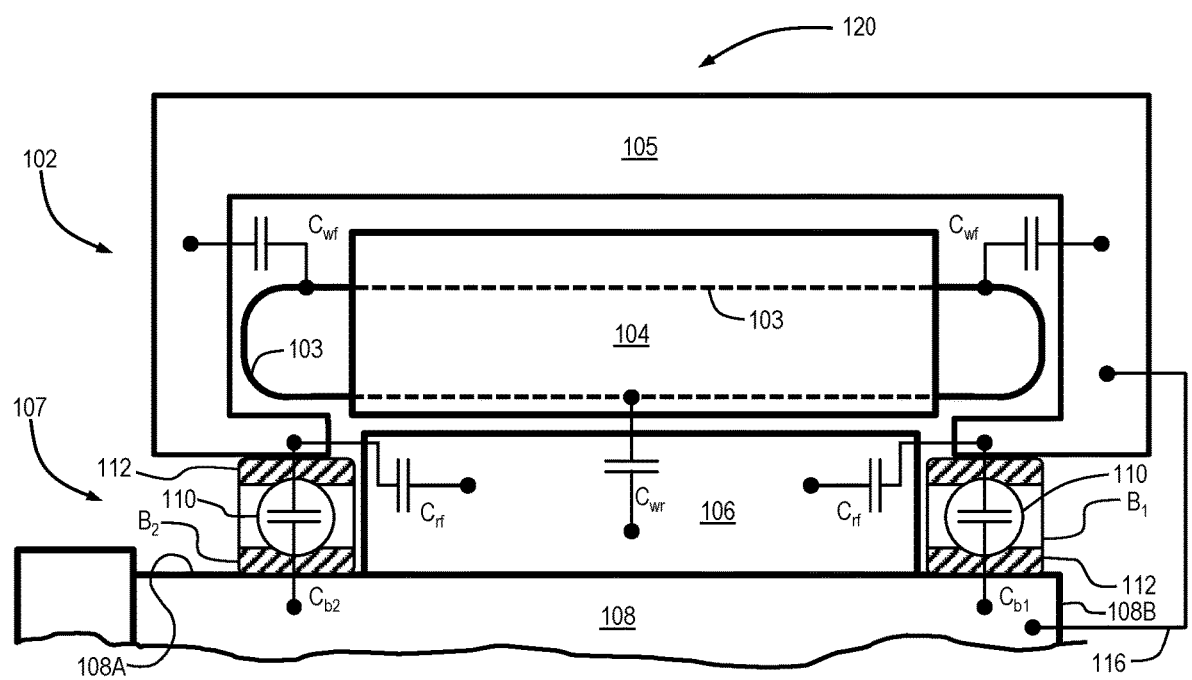
Figure 1C:
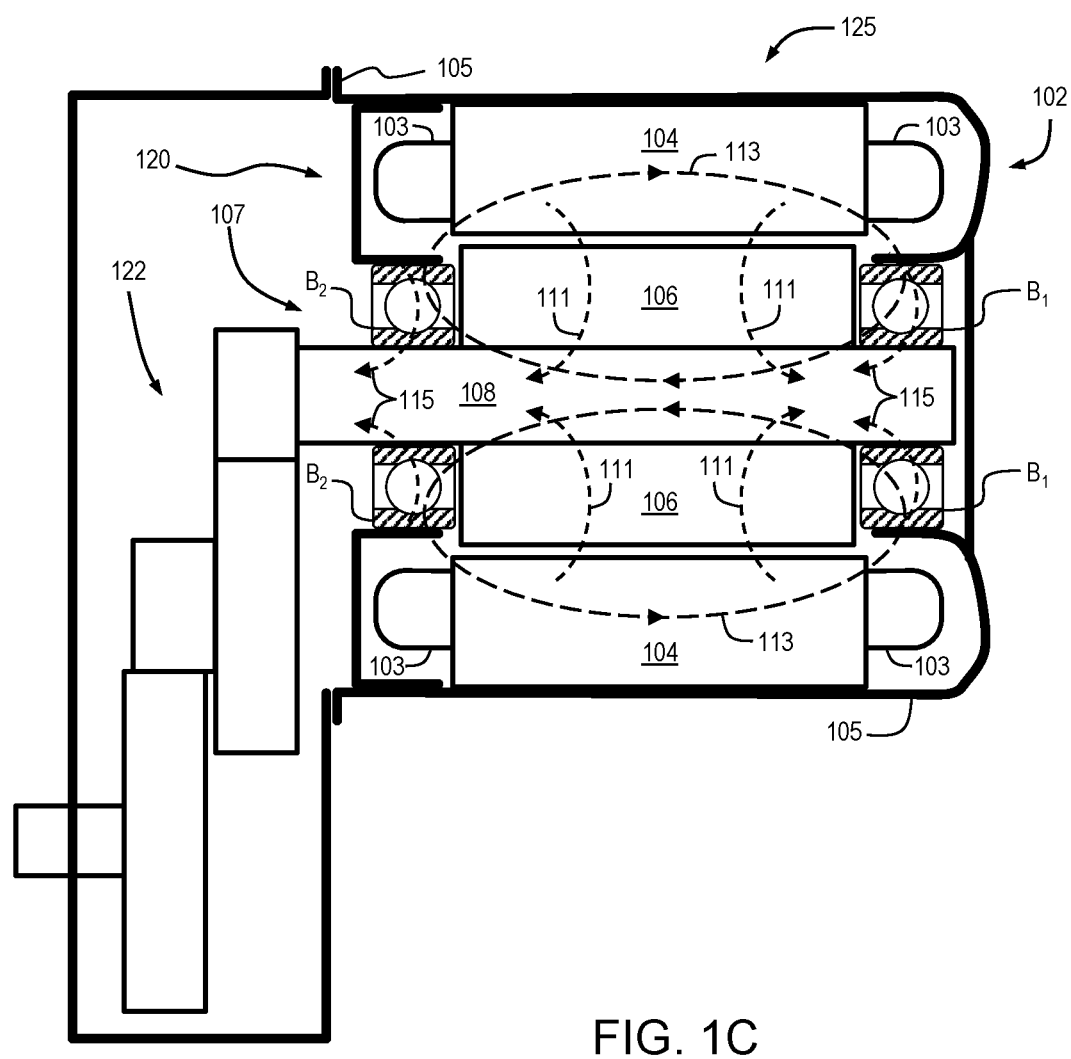

The power inverter operates by synthesizing multi-phase AC voltages which are applied to corresponding stator phase windings of the multi-phase stator winding of the motor over an AC bus. In addition to the fundamental voltages output onto the AC bus, there may be parasitic excitations as a result of non-ideal waveforms. In a balanced three phase system, for example, the three fundamental AC voltages may be substantially sinusoidal and separated by 120 degrees. The summation of the three phase voltages would be equal to zero in an ideal system. However, the power inverter operates by high frequency switching of a DC voltage to synthesize sinusoidal voltages over time. Instantaneous voltages on the AC bus and at the stator phase windings may appear as square waveforms whose summations may not equal zero, thus resulting in high frequency excitations within the motor manifesting in common mode voltages on the stator phase windings. A simplified model of such a motor 120 is illustrated in FIGS. 1A, 1B and 1C. FIGS. 1A and 1B model an impedance network 101 including a plurality of inherent machine parasitic capacitances "C" among major components and common mode excitation voltages $V_{com}$. Impedance as used herein may refer to electrical resistance, capacitance or inductance, though it is understood that capacitive impedance is inversely proportional to capacitance and frequency and inductive impedance is proportional to inductance and frequency. The impedance network 101 may include a winding to frame capacitance $C_{wf}$ from the stator windings 103 in the stator core 104 of the stator 102 to the motor frame 105, a winding to rotor capacitance $C_{wr}$ from the stator windings 103 in the stator core 104 to the rotor core 106 and rotor shaft 108 of the rotor 107, a rotor to frame capacitance $C_{rf}$ from the rotor core 106 and rotor shaft 108 of the rotor 107 to the motor frame 105, and bearing impedances $C_{b1}$ and $C_{b2}$ from the rotor core 106 and rotor shaft 108 of the rotor 107 to the motor frame 105 through the bearing $B_1$ and $B_2$, respectively. This impedance network 101 may be excited by the common mode voltages $V_{com}$ appearing on the AC bus due to the power inverter operation. The FIGS. 1A and 1B model corresponds to motor 120 having a pair of bearings $B_1$ and $B_2$ though additional bearing may found in other embodiments. Bearing may include rolling elements 110 and race elements 112.

Various induced currents may be present in the power inverter driven AC motor 120 and are illustrated by the FIG. 1C model of the motor 120 embodied in an electric drive unit 125 for vehicle propulsion. FIG. 1C additionally schematically illustrates an integrated gearset 122. Traditional capacitive currents 111 through the motor 120 may include low amplitude displacement currents through the bearing impedances $C_{b1}$ and $C_{b2}$ due to the voltage appearing on the rotor core 106 and rotor shaft 108 of the rotor 107 (between $C_{wr}$ and $C_{rf}$ in FIG. 1A). Ground currents 115 may flow between the stator windings 103 and motor frame 105 creating a circumferential flux through the motor 120 that induces a voltage across the rotor shaft 108 and results in circulating currents 113 flowing through the bearing impedances $C_{b1}$ and $C_{b2}$. As illustrated in FIG. 1C, the circulating currents may flow through the bearing $B_1$ and $B_2$ in opposite directions. Rotor ground currents 115 may flow through the bearing impedances $C_{b1}$ and $C_{b2}$ as stray currents if the impedance of the rotor 107 back to the inverter frame is lower than the stator core 104 back to the inverter frame. Such rotor ground currents 115 may not be significant in systems with short AC bus cable runs, frame integrated inverters and shielded AC bus cables. Electrical discharge machining (EDM) currents through the bearing $B_1$ and $B_2$ differ from the capacitive displacement currents as EDM currents are partial discharge currents within and through the bearings which may occur due to changes in the bearing impedance. Operating factors such as bearing load, speed and temperature may affect changes in the bearing impedance. Also, design factors such as sealed versus hydrodynamic effects of open, oil lubricated bearings may affect changes in the bearing impedance. Transient factors may also affect changes in the bearing impedance and may include rapid load increases, debris and vibration which may cause closing of the rolling element to race gap. Reductions in the bearing impedance may result in effective shorting of the bearings and undesirable discharge of the rotor voltage as EDM currents.

Figure 2:
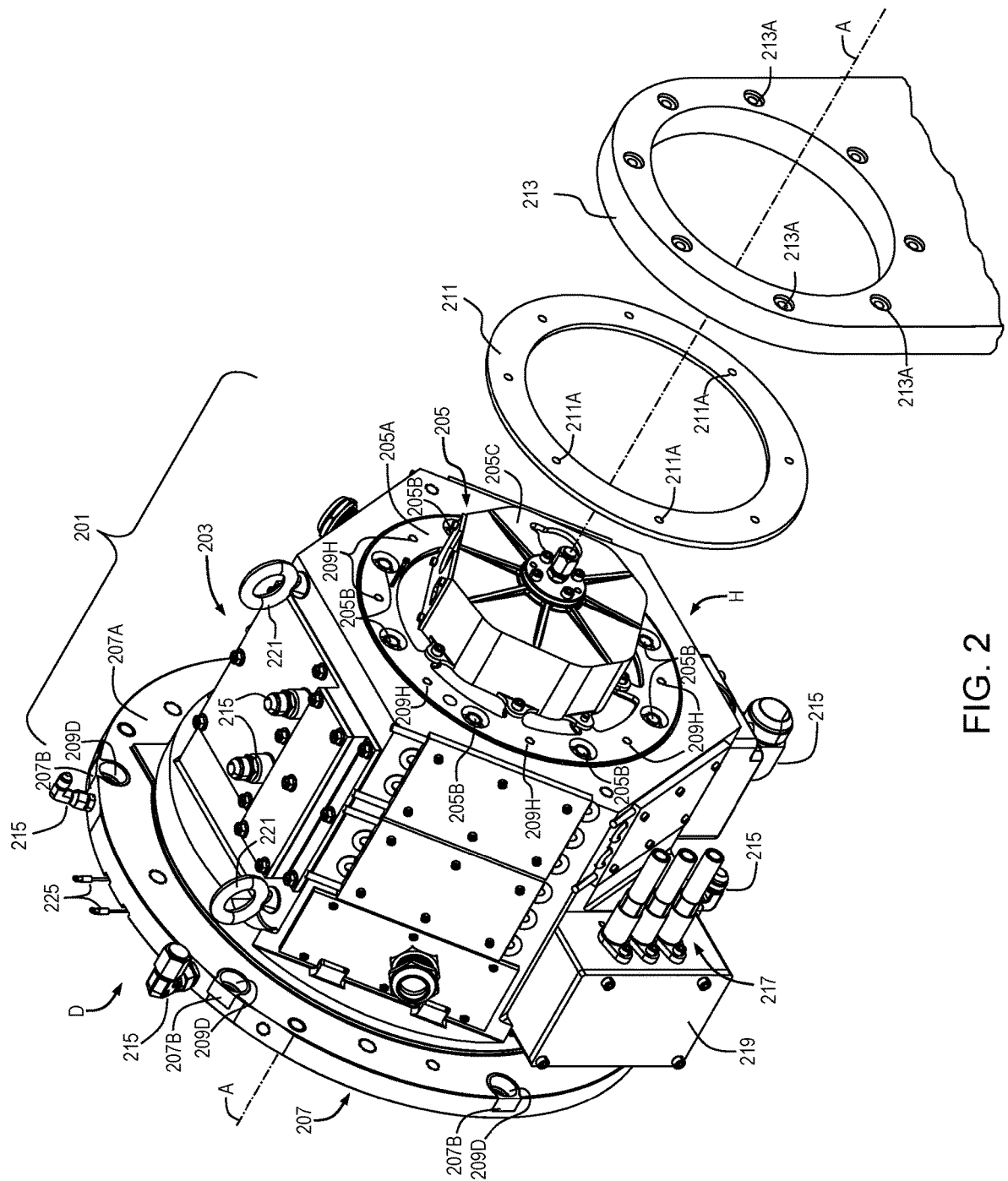
FIG. 2 illustrates an apparatus for electrically isolating a rotary electric machine, in accordance with one or more embodiments.

An apparatus useful for electrically isolating a rotary electric machine, such as a motor 120 as described with respect to FIGS. 1A-1C herein, and for acquiring data related thereto is illustrated in FIGS. 2-7. FIG. 2 is an exterior perspective view of an exemplary apparatus 201 providing an enclosed space for the motor 120 including the rotor 107 having the rotor core 106 attached to the rotor shaft 108, bearings $B_1$ and $B_2$ rotatably supporting the rotor 107, and the stator 102 surrounding the rotor 107 and including the stator core 104 and stator windings 103. Apparatus 201 is an embodiment of an enclosure containing the motor 120 though any suitable structure or mechanical framework, whether closed or open to the environment, may constitute an enclosure as set forth herein provided such structure rotatably supports the rotor 107 and effects the isolation of the motor 120 as described herein.

Figure 3:
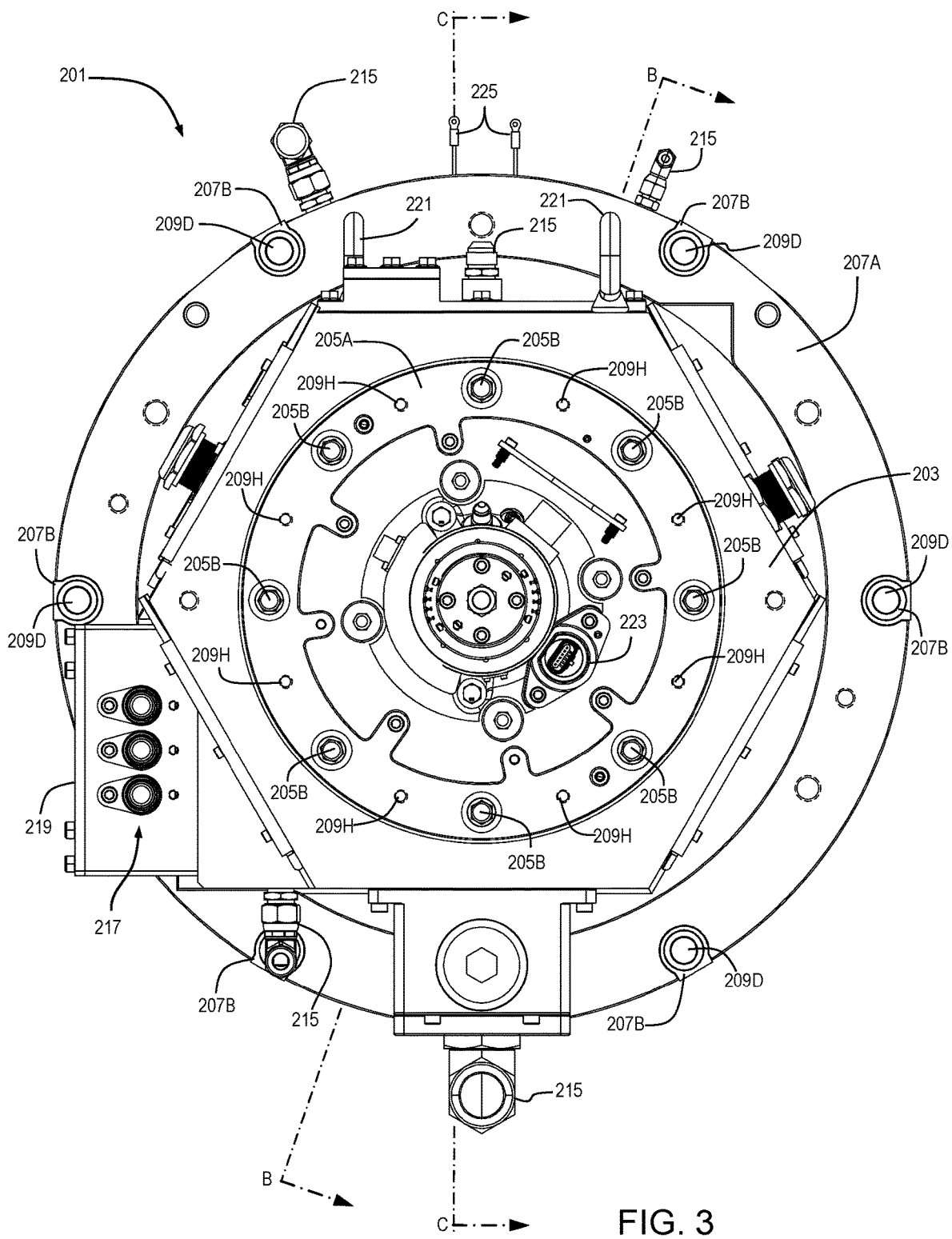
FIG. 3 illustrates an apparatus for electrically isolating a rotary electric machine, in accordance with one or more embodiments.

FIG. 3 is an exterior end view of the exemplary apparatus 201 of FIG. 2 viewed from a housing end "H" of the apparatus 201 as shown in FIG. 2. In an embodiment, the apparatus 201 may include a motor rotational axis "A" surrounded by a housing 203, a housing end assembly 205 and a dyne adapter assembly 207. The housing end assembly 205 may be removably attached to the housing 203 at the housing end H of the apparatus 201 by a plurality of fasteners 205B such as bolts. The dyne adapter assembly 207 may be removably attached to the housing 203 at a dyne end "D" of the apparatus 201 opposite the housing end H of the apparatus 201 in similar fashion. The assembly including the housing 203 and the housing end assembly 205 and the dyne adapter assembly 207 may functionally correspond to the motor frame 105 as described herein in conjunction with FIGS. 1A-1C. The apparatus 201 may be supported by a fixture, for example a dynamometer test assembly. For example, the housing end H and the dyne end D may be removably attached to respective fixture brackets of the fixture at fastener locations 209H and 209D located, respectively, at the perimeters of a housing end plate 205A of the housing end assembly 205 and a dyne adapter end plate 207A of the dyne adapter assembly 207. In an embodiment, the fixture brackets may be galvanically isolated (DC isolated) from the dyne adapter end plate 207A and the housing end plate 205A, for example by isolator pads trapped between and separating each fixture bracket and the respective dyne adapter end plate 207A and the housing end plate 205A. In an embodiment, isolator pads may be annular isolator rings. The thickness of the isolator rings is also sufficient to provide a high AC impedance (AC isolation) between each fixture bracket and the respective dyne adapter end plate 207A and the housing end plate 205A. As used herein, isolation, isolated and other forms of the words are understood to mean high impedance to both DC and AC electrical current. It is understood that fixture brackets may include any suitable structure for attaching or mechanically grounding the apparatus 201 to a fixture and may take other forms, for example attachment to the housing 203 of the apparatus alone or in combination with attachment to the housing end plate 205A and/or a dyne adapter end plate 207A.

FIG. 2 illustrates an isolator ring 211 and fixture bracket 213 at the housing end H in a disassembled view for clarity. The fixture bracket 213 includes a plurality of through holes 213A and the isolator pad that is the isolator ring 211 includes a corresponding plurality of through holes 211A. The through holes 213A and 211A allow passage of fasteners such as bolts for engagement to threaded holes at the fastener locations 209H in the housing end plate 205A. To maintain isolation of the fixture bracket 213 and the housing end plate 205A, isolator sleeves may line the through holes. Alternatively, plastic or plastic coated fasteners may be used in the through holes 213A to fasten together the fixture bracket 213, the isolator ring 211 and the housing end plate 205A. A similar arrangement of a fixture bracket and isolator ring may be employed to secure the dyne adapter end plate 207A at the dyne end D. In an embodiment, the fastener locations 209D in the dyne adapter end plate 207A are through holes lined with isolator sleeves 207B having a flanged portion for engaging the underside of the head of a bolt and a liner running the interior length of the through holes. Separate pieces may be employed such as a liner and a washer for beneath the head of the bolt. Fasteners such as bolts may pass through the through holes 209D, corresponding through holes in an isolator ring and secure to threaded receiving holes in a fixture bracket similar to the isolator ring 211 and fixture bracket 213 complement at the housing end H of the apparatus 201. Alternative mounting fasteners including nuts and bolts and threaded studs and nuts may be employed to fasten together the fixture brackets, the isolator rings and the end plates at the housing end H and the dyne end D of the apparatus 201. FIGS. 2 and 3 further show a plurality of fluid fittings 215 for lubrication and cooling fluid connections, a removable electrical closeout 219 for accessing stator electrical connections to AC voltage cables 217, hoist eyelets 221 for top-side lifting of the apparatus 201, a housing end cover 205C, a resolver electrical connector 223, and jumper leads 225, some of which may be discussed in further detail herein in conjunction with other FIGS.

Figure 4:
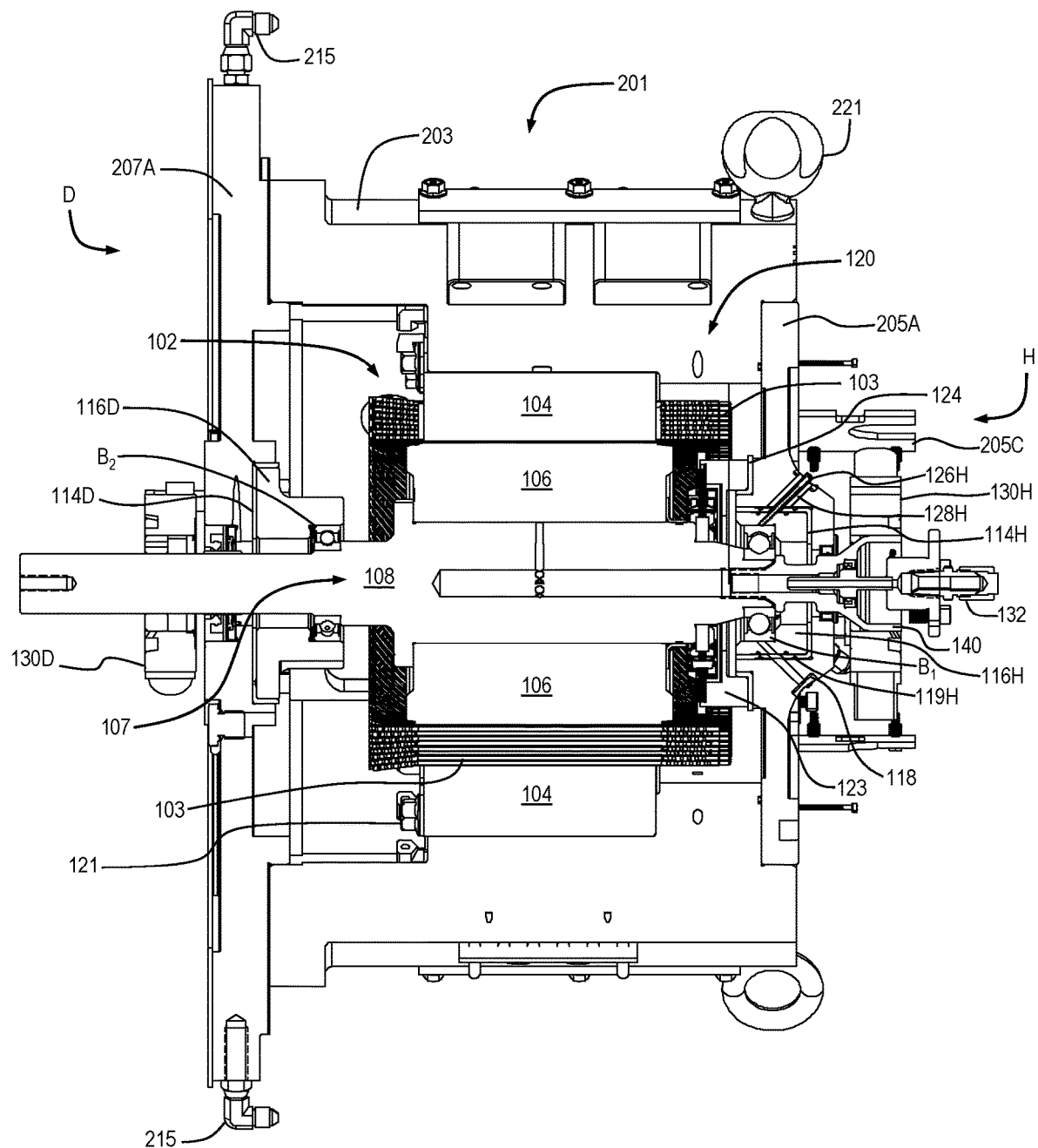
FIG. 4 illustrates a sectional view of an apparatus for electrically isolating a rotary electric machine, in accordance with one or more embodiments.
Figure 5:
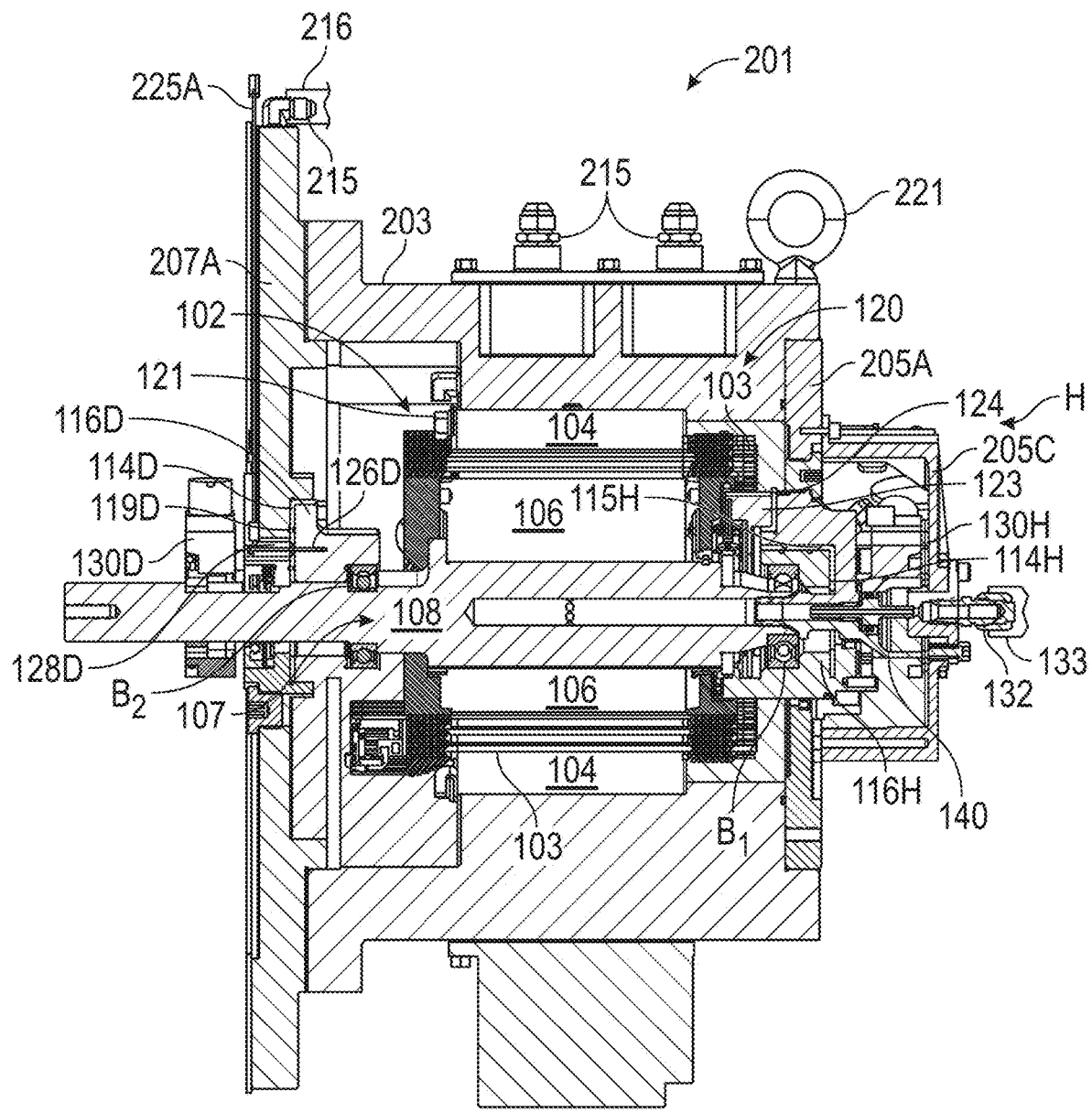
FIG. 5 illustrates a sectional view of an apparatus for electrically isolating a rotary electric machine, in accordance with one or more embodiments.

In addition to the isolation of the apparatus 201 from a test fixture (e.g., a dynamometer test assembly), isolation of the rotating components of the motor 120 within the apparatus 201 is shown in detail in FIGS. 4-7. FIG. 4 illustrates the apparatus 201 of FIGS. 2 and 3 in a section view taken along line B-B of FIG. 3. FIG. 5 illustrates the apparatus 201 of FIGS. 2 and 3 in a section view taken along line C-C of FIG. 3. With reference first to both FIGS. 4 and 5, the stator 102 of the motor 120 is fixed within the housing 203 by bolts 121 passing through the lamination stack that is the stator core 104 and fastening to threaded receivers within interior walls of the housing 203. The rotor core 106 is surrounded by the stator 102 and rotatably supported at opposite ends of the rotor 107 at the rotor shaft 108 by respective bearings $B_1$ and $B_2$. Each bearing $B_1$ and $B_2$ is affixed to a respective one of the housing end plate 205A and the dyne adapter end plate 207A. As described herein, the housing end plate 205A and the dyne adapter end plate 207A are affixed to the housing 203 to complete the enclosed assembly that is the apparatus 201. Each bearing $B_1$ and $B_2$ may be affixed to a respective bearing hub such as by press fitting into the respective bearing hub. The bearing hub containing bearing $B_1$ at the housing end H is designated 116H and the bearing hub containing bearing $B_2$ at the dyne end D is designated 116D. The bearing hubs 116H and 116D are electrically conductive, for example various iron alloys. The bearing hub 116H is assembled to the housing end plate 205A with an intermediate bearing hub isolator pad 114H therebetween for electrical isolation of the bearing and hub from the housing end plate 205A and housing 203. Similarly, the bearing hub 116D is assembled to the dyne adapter end plate 207A with an intermediate bearing hub isolator pad 114D therebetween for electrical isolation of the bearing and hub from the dyne adapter end plate 207A and housing 203. O-rings 119H and 119D on both sides of the bearing hub isolator pads 114H and 114D may provide sealing from lubricants and coolants for example. The bearing hubs 116H and 116D are fastened to the respective housing end plate 205A and dyne adapter end plate 207A by bolts or alternative fasteners. Since isolation of the rotor 107 is an objective, the bolts may be plastic or plastic coated or surrounded by an isolator sleeve sufficient to provide the isolation of the bearing hubs 116H and 116D from the respective housing end plate 205A and dyne adapter end plate 207A.

The motor 120 may further include a resolver 123 or other rotational sensor having a rotating portion engaged with the rotor 107, for example to the rotor shaft 108, and a static portion fixed to the housing end plate 205A. In an embodiment, the static portion of the resolver 123 may be isolated from the housing end plate 205, for example by isolator pads trapped between and separating the rotating portion of the resolver 123 and the housing end plate 205A. In an embodiment, isolator pads may be an isolator ring 124. Fastening of the resolver to the housing end plate 205A may be with bolts which may be plastic or plastic coated or which are isolated by use of isolator sleeves as previously described.

Having thus described an apparatus 201 for electrically isolating a motor 120 from a test fixture (e.g., a dynamometer test assembly) to which it is affixed, and further effective for electrically isolating the rotating components of the motor 120 within the apparatus 201, instrumenting the apparatus useful for data acquisition in the characterization of induced voltages and currents within the motor 120 may now be described with continued reference to FIGS. 4 and 5 and additional reference to FIGS. 6 and 7. In FIG. 4, with reference to the housing end H of the apparatus 201, a galvanic probe 126H is seen breaching the housing end plate 205A and galvanically coupling with the bearing hub 116H which is in tight and clean galvanic coupling with the bearing $B_1$ by virtue of the press fit assembly. Conductive leads or jumper leads may be galvanically connected to the exposed end of the probe 126H and utilized in voltage and current measurements. For example, when a probe through the associated jumper lead is electrically connected back to the housing 203, the housing end plate 205A or the dyne adapter end plate 207A, it provides a confined path for the flow of stray currents between otherwise galvanically isolated subsystems which would allow measurement of such currents. When the probe is disconnected, it provides access for measuring parasitic voltages that are induced on the galvanically isolated subsystems. Advantageously, the probe 126H is accessible from outside of the enclosure and is thus exteriorly accessible. In an embodiment, the probe may be a screw with a threaded end engaged with the bearing hub 116H and an exposed head to which a jumper lead may attach. In an embodiment, jumper leads may have a terminal that rests beneath the head of the probe and may be secured thereto upon insertion and assembly of the probe 126H through the housing end plate 205A and to the bearing hub 116H. The access breach in the housing end plate 205A may be fitted with an isolator sleeve 128H to maintain isolation of the housing end plate 205A from the probe 126H, the bearing hub 116H and hence the rotor 107. Another access breach 118 is illustrated for providing access into the bearing hub 116H through the housing end plate 205A. The access breach 118 may be used for instrumenting the apparatus with a temperature probe for example. As with the probe 126H, the instrumentation inserted through the access breach 118 may be surrounded by a dielectric isolator such as a sleeve in order to maintain the isolation integrity of the instrumentation, the bearing hub 116H and hence the rotor 107. In FIG. 5, with reference to the dyne end D of the apparatus 201, a galvanic probe 126D is seen breaching the dyne adapter end plate 207A and galvanically coupling with the bearing hub 116D which is in tight and clean galvanic coupling with the bearing $B_2$ by virtue of the press fit assembly. Conductive jumper lead 225A may be connected to the exposed end of the probe 126D and utilized in voltage and current measurements. Advantageously, the probe 126D is accessible from outside of the enclosure and is thus exteriorly accessible. In an embodiment, the probe may be a screw with a threaded end engaged with the bearing hub 116D and an exposed head to which a jumper lead may attach. In an embodiment, jumper leads may have a terminal that rests beneath the head of the probe and may be secured thereto upon insertion and assembly of the probe 126D through the dyne adapter end plate 207A and to the bearing hub 116D. The access breach in the dyne adapter end plate 207A may be fitted with an isolator sleeve 128D as previously described to maintain isolation of the dyne adapter end plate 207A from the probe 126D, the bearing hub 116D and hence the rotor 107. Additional access breaches (not shown) for providing access to the bearing hub 116D through the dyne adapter end plate 207A may be provided for instrumenting the apparatus with a temperature probe of the bearing hub 116D at the dyne end D of the apparatus 201. As with the probe 126D, instrumentation inserted through other access breaches may be sur- rounded by a dielectric isolator such as a sleeve in order to maintain the isolation integrity of the instrumentation, the bearing hub 116D and hence the rotor 107.

In each of FIGS. 4 and 5, a slip ring assembly 130H at the housing end H and a slip ring assembly 130D at the dyne end D are fitted external to the housing 203 for maintaining dynamic galvanic contact with the rotating rotor 107 at opposite ends of the rotor shaft 108. At the dyne end D, the rotor shaft 108 extends beyond the dyne adapter end plate 207A and the slip ring assembly 130D may directly contact the rotor shaft 108. At the housing end H, the rotor shaft 108 may not extend beyond the housing end plate 205A. Therefore, in an embodiment, rotor shaft extension 140 may be splined to the rotor shaft 108 to provide an external galvanic contact surface for the slip ring assembly 130H. The slip ring assemblies 130H and 130D may be attached to the respective housing end plate 205A and dyne adapter end plate 207A through an isolated attachment in consideration of maintaining isolation integrity of such instrumentation and hence the rotor 107. The slip ring assemblies may therefore be utilized in voltage and current measurements on opposite ends of the rotor shaft to characterize bulk rotor shaft voltage and rotor shaft voltage differential between ends of the rotor shaft 108. The housing end cover 205C may mechanically and electrically shield the instrumentation described at the housing end H of the apparatus 201. A similar shield (not shown) may be employed at the dyne side of the apparatus 201.

A fluid fitting 132 for lubrication and cooling fluid may be coupled to passages in the rotor shaft 108 through the rotor shaft extension 140. Fluid fitting 132 and other fluid fittings 215 may also be isolated from the apparatus 201 and connected exterior features such as the fixture and fluid delivery apparatus through design material selections, isolation bushings and threaded inserts. Non-conductive tubing 133, 216 such as rubber may provide isolation of the exterior features from the fluid fittings 132 and 215 from the apparatus 201.

Figure 6:
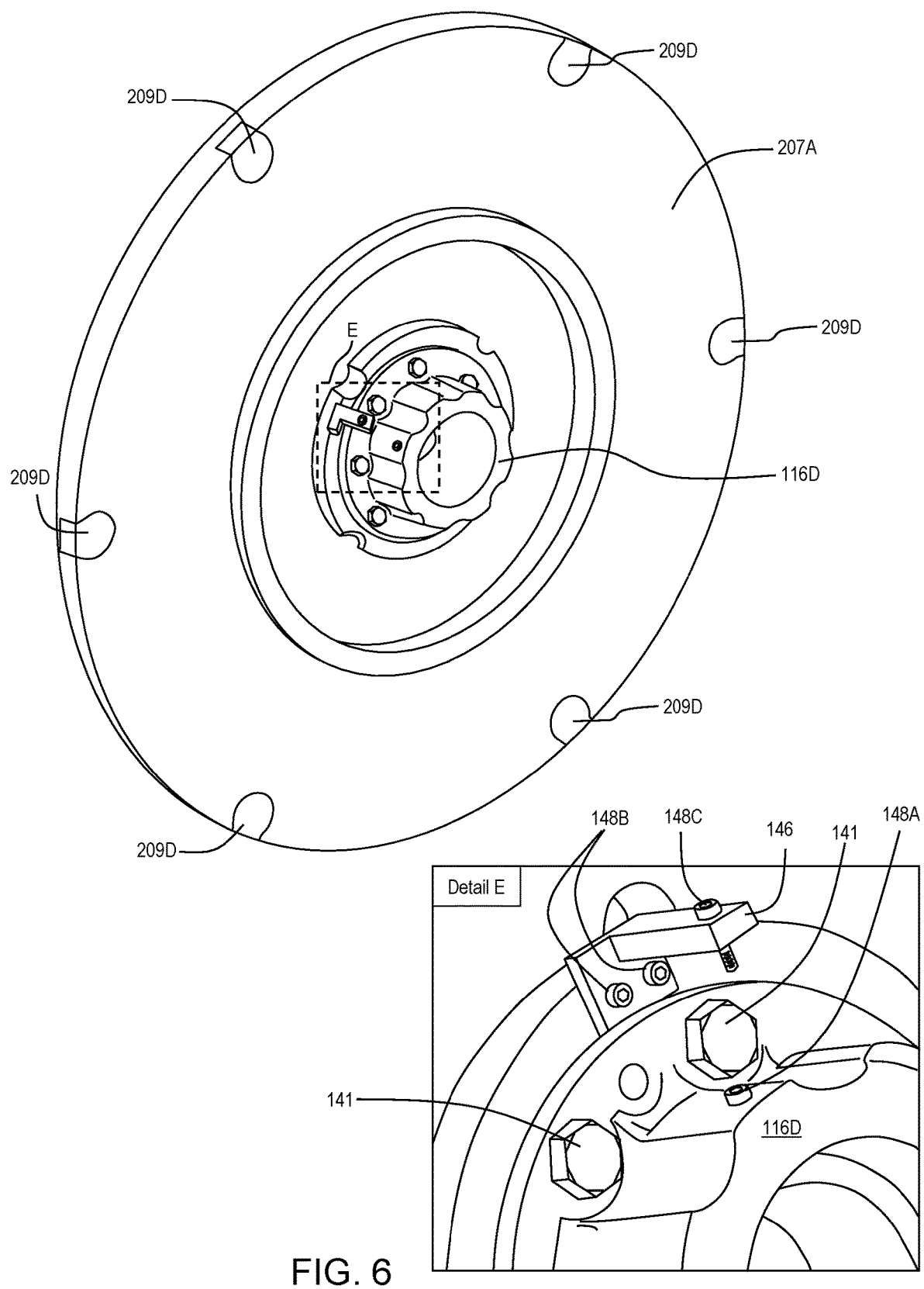
FIG. 6 illustrates instrumentation connection features of an apparatus for electrically isolating a rotary electric machine, in accordance with one or more embodiments.
Figure 7:
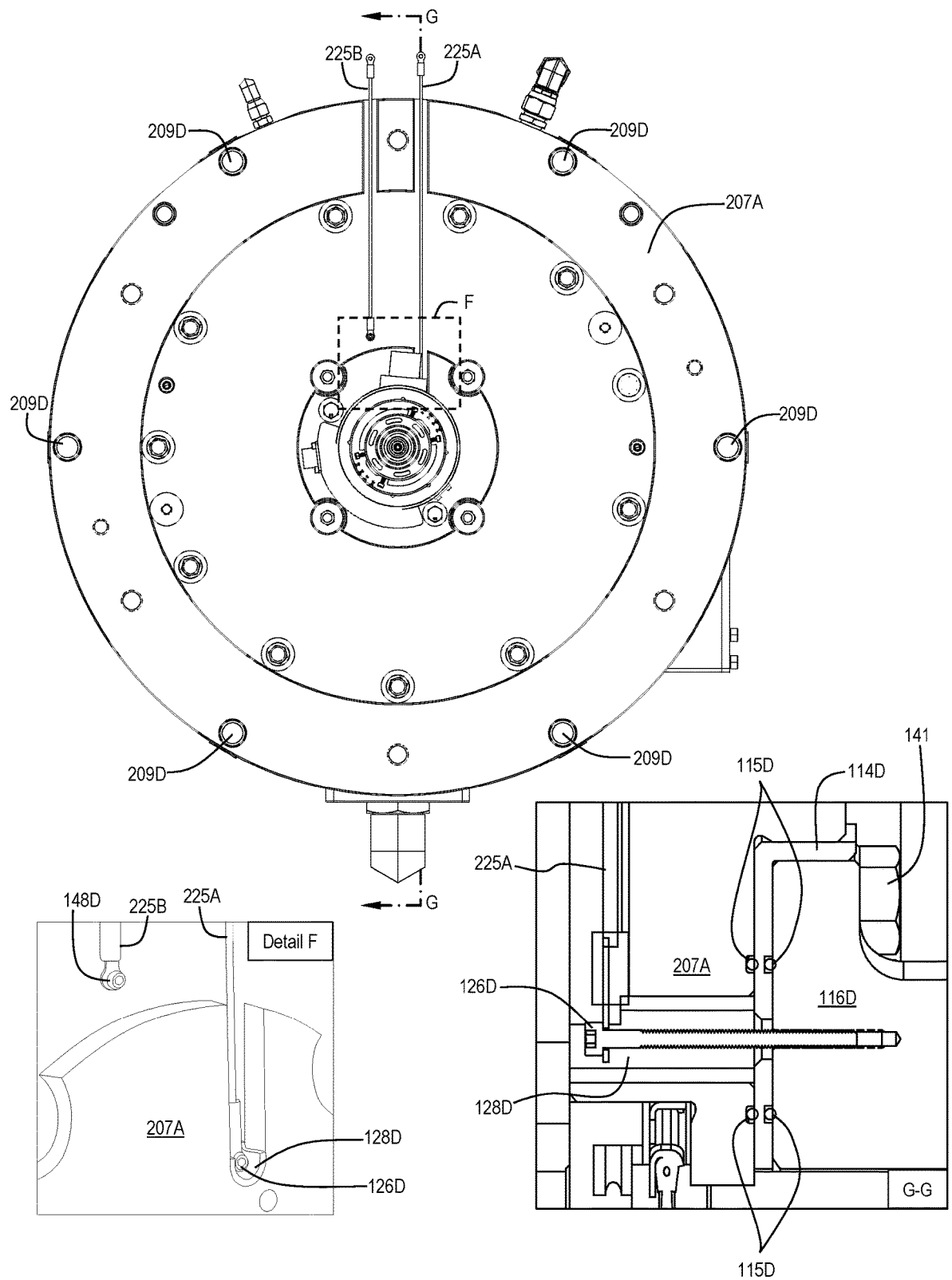
FIG. 7 illustrates instrumentation connection features of an apparatus for electrically isolating a rotary electric machine, in accordance with one or more embodiments.

FIGS. 6 and 7 illustrate embodiments of galvanic coupling to the bearing hub 116D and a proximate galvanic coupling to dyne adapter end plate 207A. FIG. 6 illustrates a view of the dyne adapter end plate 207A and bearing 116D from inside the apparatus 201. In this embodiment, the bearing hub 116D is shown attached to the dyne plate adapter with bolts 141. It is appreciated that the bolts may be plastic or otherwise dielectric, may be an externally plasticized, metallic cored bolt, or may be metallic and used in a cooperative arrangement with a flanged or non-flanged isolator sleeve, liner, bushing, washer, etc. to maintain isolation integrity. The portion of FIG. 6 labeled "E" is shown in additional detail in the inset. Galvanic connection to terminals on jumper leads (not shown) may be made to the bearing hub 116D via a galvanic probe screw 148A. A similar probe screw may connect a jumper lead directly to the dyne adapter end plate 207A. Alternatively, as illustrated a contact arm 146 may be galvanically mechanically secured to the dyne adapter end plate 207A by a pair of probe screws 148B and provide a probe screw 148C and connection point more readily accessible and serviceable for example through an access panel of the housing 203. The probe screws 148A and 148C are accessible from inside of the enclosure and are thus interiorly accessible. The embodiment of FIG. 6 may advantageously provide for short length jumper leads. FIG. 7 illustrates various views of the dyne adapter end plate 207A including a full and detailed view from outside the apparatus 201 and a detailed sectional view along the line G-G. In this embodiment, the jumper lead 225B is shown galvanically connected directly to the dyne adapter end plate 207A by a probe screw 148D and the jumper lead 225A is shown galvanically connected directly to the bearing hub 116D by the galvanic probe 126D through the dyne adapter end plate 207A. Isolation of the galvanic probe 126D may be provided by an isolator sleeve 128D.

The length of the galvanic path including galvanic probes, galvanic probe screws and jumper leads, if present, is advantageously kept at a minimum to provide a low impedance path between the isolated subsystems compared to their original state in a non-isolated system, as well as reducing noise on the acquired voltage and current signals.

Primarily, high AC impedance at the isolator pads (e.g., fixture brackets to apparatus 201, bearing hub to housing end plate 205A and dyne adapter end plate 207A, and the rotating portion of the resolver 123 and the housing end plate 205A) and at the interface area of the fasteners may be achieved by increasing capacitive reactance at those sites. The capacitive reactance is proportional to the thickness of the isolator pad and inversely proportional to the pad area and to the frequency of the AC signal. Thus, for example, with knowledge of the highest AC signal frequencies of interest based on the switching frequency of the power inverter and number of machine phases, the interface area of the isolator pad and thickness of the isolator pad are design parameters that may be adjusted to achieve suitable isolation. In an embodiment, an AC impedance that achieve at least one order of magnitude reduction in AC signals at the interface area may be deemed suitable isolation. In an embodiment, for example at the bearing hubs where galvanic probes may be employed for data acquisition, the capacitive reactance at the isolation pads at a given frequency may be at least one order of magnitude larger than the impedance of the bearing or the galvanic probes. Similar considerations for the galvanic probe isolation provided by isolator sleeves are given and, in an embodiment, the capacitive reactance at the isolator sleeves at a given frequency may be at least one order of magnitude larger than the impedance of the galvanic probes.

In an embodiment, the galvanic probes and galvanic probe screws may be fabricated from copper, aluminum or other conductive metals and alloys.

In an embodiment, isolator pads, liners, washers, sleeves, coatings and the like may be fabricated from a suitable dielectric material such as PolyEtherEtherKetone (PEEK). Glass filled PEEK, for example 30% glass filled, has demonstrated temperature, chemical and mechanical properties required for such an apparatus. Other materials, for example, PolyEtherKetoneKetone (PEKK) may have similar demonstrated temperature, chemical and mechanical properties required for such an apparatus. These and other thermoplastics may advantageously be used in injection molding or additive manufacturing of parts.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

All numeric values herein are assumed to be modified by the term "about" whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally. Similarly, numeric values set forth herein are by way of non-limiting example and may be nominal values, it being understood that actual values may vary from nominal values in accordance with environment, design and manufacturing tolerance, age and other factors.

Unless explicitly described as being "direct," when a relationship between first and second elements is described in the above disclosure, that relationship can be a direct relationship where no other intervening elements are present between the first and second elements but can also be an indirect relationship where one or more intervening elements are present (either spatially or functionally) between the first and second elements.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An apparatus for electrically isolating a rotary electric machine, comprising:
    an enclosure for the rotary electric machine, comprising:
        a housing supporting a stator of the electric machine, the housing having first and second ends;
        first and second end plates attached to the housing and rotatably supporting a rotor at opposite ends with respective first and second bearings, the bearings being isolated from the end plates; and
        wherein the first and second bearings are affixed to respective bearing hubs, and wherein each of the first and second bearing hubs is isolated from a respective one of the first and second end plates with a respective isolator pad trapped between and separating the respective bearing hub and the respective one of the first and second end plates.

2. The apparatus of claim 1, further comprising a fixture to which the enclosure is mechanically grounded.

3. The apparatus of claim 2, wherein the fixture is isolated from the enclosure.

4. The apparatus of claim 3, wherein the enclosure is mechanically grounded to the fixture through a fixture bracket that is isolated from the enclosure by an isolator pad trapped between the fixture bracket and the enclosure.

5. The apparatus of claim 1, further comprising first and second slip rings maintaining dynamic galvanic contact with the rotor at respective opposite ends, each of the first and second slip rings supported by one of the first and second end plates, the slip rings being isolated from the end plates.

6. The apparatus of claim 1, further comprising a rotational sensor having a rotating portion engaged with the rotor and a static portion affixed to one of the first and second end plates.

7. The apparatus of claim 6, wherein the static portion of the rotational sensor is isolated from the one of the first and second end plates with an isolator pad trapped between and separating the static portion of the rotational sensor and the one of the first and second end plates.

8. The apparatus of claim 1, further comprising O-ring seals between each respective isolator pad and the respective bearing hub and between the respective isolator pad and the respective one of the first and second end plates.

9. The apparatus of claim 1, further comprising a probe galvanically coupling to one of the first and second bearing hubs and interiorly accessible.

10. The apparatus of claim 1, further comprising a probe passing through one of the first and second end plates and into to the respective bearing hub, the probe being isolated from the end plates.

11. The apparatus of claim 10, further comprising a jumper lead galvanically coupled to the probe.

12. The apparatus of claim 1, further comprising a probe passing through one of the first and second end plates and galvanically coupling to the respective bearing hub, the probe being isolated from the end plates and exteriorly accessible.

13. The apparatus of claim 1, further comprising fluid fittings on the enclosure coupled to non-conductive tubing.

14. An apparatus for electrically isolating a rotary electric machine, comprising:
    an enclosure for the rotary electric machine, comprising:
        a housing supporting a stator of the electric machine, the housing having first and second ends;
        first and second end plates attached to the housing and rotatably supporting a rotor at opposite ends with respective first and second bearings, the bearings being isolated from the end plates, wherein the first and second bearings are affixed to respective bearing hubs, and wherein each of the first and second bearing hubs is isolated from a respective one of the first and second end plates with a respective isolator pad trapped between and separating the respective bearing hub and the respective one of the first and second end plates; and
    a fixture to which the enclosure is mechanically affixed through respective fixture brackets affixed to the first and second end plates, the first and second end plates isolated from the respective brackets by respective isolator pads trapped between and separating the first and second end plates and the respective brackets.

15. The apparatus of claim 14, further comprising first and second slip rings maintaining dynamic galvanic contact with the rotor at respective opposite ends, each of the first and second slip rings supported by one of the first and second end plates, the slip rings being isolated from the end plates.

16. The apparatus of claim 14, further comprising a rotational sensor having a rotating portion engaged with the rotor and a static portion affixed to one of the first and second end plates, wherein the static portion of the rotational sensor is isolated from the one of the first and second end plates with an isolator pad trapped between and separating the static portion of the rotational sensor and the one of the first and second end plates.

17. The apparatus of claim 14, further comprising a probe passing through one of the first and second end plates and galvanically coupling to the respective bearing hub, the probe being isolated from the end plates and exteriorly accessible.

18. The apparatus of claim 14, further comprising:
 first and second slip rings maintaining dynamic galvanic contact with the rotor at respective opposite ends, each of the first and second slip rings supported by one of the first and second end plates, the slip rings being isolated from the end plates; and
 a rotational sensor having a rotating portion engaged with the rotor and a static portion affixed to one of the first and second end plates, wherein the static portion of the rotational sensor is isolated from the one of the first and second end plates with an isolator pad trapped between and separating the static portion of the rotational sensor and the one of the first and second end plates.

19. The apparatus of claim 14, further comprising a fixture to which the enclosure is mechanically grounded, wherein the fixture is isolated from the enclosure and wherein the enclosure is mechanically grounded to the fixture through a fixture bracket that is isolated from the enclosure by an isolator pad trapped between the fixture bracket and the enclosure.

20. An apparatus for electrically isolating a rotary electric machine, comprising:
 an enclosure for the rotary electric machine, comprising:
  a housing supporting a stator of the electric machine, the housing having first and second ends;
  first and second end plates attached to the housing and rotatably supporting a rotor at opposite ends with respective first and second bearings, the bearings being isolated from the end plates, wherein the first and second bearings are affixed to respective bearing hubs, and wherein each of the first and second bearing hubs is isolated from a respective one of the first and second end plates with a respective isolator pad trapped between and separating the respective bearing hub and the respective one of the first and second end plates;
 first and second slip rings maintaining dynamic galvanic contact with the rotor at respective opposite ends, each of the first and second slip rings supported by one of the first and second end plates, the slip rings being isolated from the end plates;
 a probe passing through one of the first and second end plates and galvanically coupling to the respective bearing hub, the probe being isolated from the end plates and exteriorly accessible; and
 a fixture to which the enclosure is mechanically affixed through respective fixture brackets affixed to the first and second end plates, the first and second end plates isolated from the respective brackets by respective isolator pads trapped between and separating the first and second end plates and the respective brackets.

\* \* \* \* \*